(12) United States Patent
Tanimoto et al.

(10) Patent No.: US 8,816,544 B2
(45) Date of Patent: Aug. 26, 2014

(54) POWER TOOL WITH A HOUSING INCLUDING A GUIDE PORTION FOR GUIDING COOLING AIR ALONG A SWITCHING CIRCUIT BOARD

(75) Inventors: Hideyuki Tanimoto, Hitachinaka (JP); Nobuhiro Takano, Hitachinaka (JP); Nobuhito Hosokawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 524 days.

(21) Appl. No.: 13/063,748

(22) PCT Filed: Jan. 7, 2010

(86) PCT No.: PCT/JP2010/050363
§ 371 (c)(1),
(2), (4) Date: Mar. 11, 2011

(87) PCT Pub. No.: WO2010/087235
PCT Pub. Date: Aug. 5, 2010

(65) Prior Publication Data
US 2011/0171887 A1 Jul. 14, 2011

(30) Foreign Application Priority Data

Jan. 30, 2009 (JP) ................................. 2009-020452
May 21, 2009 (JP) ................................. 2009-123497

(51) Int. Cl.
| | | |
|---|---|---|
| *H02K 7/14* | (2006.01) | |
| *H02K 5/20* | (2006.01) | |
| *H02K 9/06* | (2006.01) | |
| *B24B 23/02* | (2006.01) | |
| *H02K 11/00* | (2006.01) | |
| *B24B 47/12* | (2006.01) | |
| *H02K 1/18* | (2006.01) | |
| *B25F 5/02* | (2006.01) | |

(52) U.S. Cl.
CPC .......... *B24B 23/028* (2013.01); *H02K 11/0073* (2013.01); *H02K 7/145* (2013.01); *B24B 47/12* (2013.01); *H02K 1/185* (2013.01); *B25F 5/02* (2013.01); *H02K 5/20* (2013.01)
USPC ................. 310/50; 310/58; 310/62; 310/68 D

(58) Field of Classification Search
USPC .............................. 310/50; 173/217; 451/359
See application file for complete search history.

(56) References Cited

U.S. PATENT DOCUMENTS

| | | |
|---|---|---|
| 5,201,146 A | 4/1993 | Fushiya |
| 6,123,158 A | 9/2000 | Steffen |

(Continued)

FOREIGN PATENT DOCUMENTS

| | | |
|---|---|---|
| CN | 1636680 A | 7/2005 |
| CN | 201018444 Y | 2/2008 |

(Continued)

OTHER PUBLICATIONS

The International Preliminary Report on Patentability and Written Opinion of the International Searching Authority of Aug. 2, 2011.

(Continued)

*Primary Examiner* — Burton Mullins
*Assistant Examiner* — Eric Johnson
(74) *Attorney, Agent, or Firm* — Kilpatrick Townsend and Stockton LLP

(57) ABSTRACT

An electric power tool includes a housing, a brushless motor, an output shaft, and a motor driver circuit. The housing defines an axial direction. The brushless motor is accommodated in the housing and having a drive shaft. The output shaft extends in a direction generally perpendicular to the drive shaft. The motor driver circuit is accommodated in the housing for driving the brushless motor. The housing has a cylindrical shape and has a part functioning as a grip portion.

14 Claims, 12 Drawing Sheets

(56) References Cited

U.S. PATENT DOCUMENTS

| | | |
|---|---|---|
| 6,320,286 B1 * | 11/2001 | Ramarathnam ................ 310/50 |
| 6,632,128 B2 | 10/2003 | Berger et al. |
| 7,088,066 B2 | 8/2006 | Haller |
| 7,330,006 B2 | 2/2008 | Iwata et al. |
| 8,084,901 B2 | 12/2011 | Oomori et al. |
| 2003/0190877 A1 | 10/2003 | Gallagher et al. |
| 2005/0153636 A1 | 7/2005 | Numata et al. |
| 2008/0014844 A1 | 1/2008 | Pontieri |
| 2009/0280732 A1 | 11/2009 | Esenwein |
| 2010/0253162 A1 | 10/2010 | Sakamaki et al. |

FOREIGN PATENT DOCUMENTS

| | | | | |
|---|---|---|---|---|
| DE | 102007017243 A1 | 10/2008 | | |
| EP | 192469 A2 * | 8/1986 | ............. | H02K 21/08 |
| EP | 1 978 631 A1 | 10/2008 | | |
| GB | 2251522 A * | 7/1992 | ............. | H02K 11/00 |
| JP | 02-114456 U | 9/1990 | | |
| JP | 04-223861 A | 8/1992 | | |
| JP | 2000-515435 A | 11/2000 | | |
| JP | 2001-150366 A | 6/2001 | | |
| JP | 2003-519578 A | 6/2003 | | |
| JP | 2003-199310 A | 7/2003 | | |
| JP | 2004-122343 A | 4/2004 | | |
| JP | 2004-215331 A | 7/2004 | | |
| JP | 2004322274 A * | 11/2004 | ................ | B25F 5/00 |
| JP | 2006-297532 A | 11/2006 | | |
| JP | 2007-196363 A | 8/2007 | | |
| JP | 2007-283447 A | 11/2007 | | |
| JP | 2008-503998 A | 2/2008 | | |
| JP | 2008-173716 A | 7/2008 | | |
| JP | 2008-307664 A | 12/2008 | | |
| WO | WO98/06245 A2 | 2/1998 | | |
| WO | WO98/06245 A3 | 2/1998 | | |
| WO | WO01/51251 A1 | 7/2001 | | |
| WO | WO 2007/089936 A2 | 8/2007 | | |

OTHER PUBLICATIONS

Japan Patent Office office action for patent application JP2009-020452 (Mar. 28, 2013).

China Intellectual Property Office office action for patent application CN2012120301057480 (Dec. 2012).

* cited by examiner

TABLE 1

TABLE 2

POWER TOOL WITH A HOUSING INCLUDING A GUIDE PORTION FOR GUIDING COOLING AIR ALONG A SWITCHING CIRCUIT BOARD

This application is a U.S. National Stage of International Application No. PCT/JP2010/050363 filed Jan. 7, 2010, and which claims the benefit of Japanese Patent Applications Nos. 2009-020452, filed Jan. 30, 2009 and 2009-123497, filed May 21, 2009 the entireties of which are incorporated by reference herein.

TECHNICAL FIELD

The present invention relates to a power tool having a brushless motor.

BACKGROUND ART

A brushless motor exhibiting high efficiency can be used as a drive source for a power tool. However, the brushless motor requires a motor driver circuit which is not required in case of an ordinary motor having a brush. In case of a power tool having a brushless motor, the motor driver circuit is accommodated in a power source box additionally provided between a housing of a power tool and an external power source as shown in FIG. 1 of publication No. 2008-504136 which is a published Japanese translation of a PTC text. If a plurality of power tools each having a brushless motor are connected to an identical external power source, each power source box is moved in accordance with the movement of the user, so that power source boxes are bumped against one another other causing damage to the power source boxes.

To avoid this problem, Japanese Patent Application publication Nos. 2007-283447 and 2006-297532 propose accommodation of a circuit board of a motor driver circuit within a housing of a power tool. More specifically, Japanese Patent Application publication No. 2007-283447 discloses a cordless impact driver where an electrical circuit board which is a part of the motor driver circuit is provided between a grip portion and a battery. Further, Japanese Patent Application publication No. 2006-297532 discloses a cordless impact driver where a control board which is a part of the motor driver circuit is accommodated in a handle portion. Furthermore, Japanese Patent Application publication No. 2008-173716 discloses a cordless hammer drill where a FET board which is a part of the motor driver circuit is accommodated within a space positioned above a brushless motor accommodation portion.

However, the layout of the motor driver circuit as described in these JP publications provides drawback in case of a power tool employed by hand-gripping a motor accommodating portion of the power tool such as a disc grinder. First, the circuit board has a portion located radially outward of the brushless motor. Therefore, a diameter of the motor accommodation portion must be increased to accommodate the circuit board therein. Consequently, the user cannot easily grip the motor accommodation portion to lower operability.

Second, the motor driver circuit includes a plurality of switching elements such as field-effect transistors (FET). These FETs release greater amount of heat in comparison with other electronic components because of flowing of driving current and high speed switching operation. Therefore, cooling to the FETs must be taken into consideration if the motor driver circuit is to be accommodated within the housing of the power tool, and further, efficient layout of the motor driver circuit board must be required. Particularly, in case of a high output power tool such as a disc grinder, AC power source is employed instead of battery power source, and accordingly, large size FETs are used. If six FETs are arrayed in a circumferential direction as described in JP 2008-173716, a diameter of a circumference must be increased, causing the housing to be bulky.

SUMMARY OF INVENTION

It is therefore an object of the present invention to provide a power tool providing a high output yet reducing a size of the housing and improving operability.

Another object of the present invention is to provide a disc grinder facilitating gripping to a body portion, and capable of providing an adequate pressing force against a workpiece with a single hand of the user.

Still another object of the invention is to provide a disc grinder having a suitable shape of a housing capable of performing desirable grinding operation without any attachment of a handle to the housing, thereby facilitating grinding operation at a narrow working site.

Still another object of the invention is to provide a disc grinder using a brushless DC motor capable of providing a sufficient rotational torque while having a constricted grip portion accommodating therein the DC motor.

These and other objects of the present invention will be attained by an electric power tool including a housing, a brushless motor, an output shaft, and a motor driver circuit. The housing defines an axial direction. The brushless motor is accommodated in the housing and has a drive shaft. The output shaft extends in a direction generally perpendicular to the drive shaft. The motor driver circuit is accommodated in the housing for driving the brushless motor. The housing has a cylindrical shape and has a part functioning as a grip portion.

Preferably, the housing has an outer diameter uniform in the axial direction.

With this structure, an entire motor driver circuit that drives the brushless motor is accommodated in the housing. Therefore, an external power source box is not required at a position between the power tool and an outside power supply. Accordingly, collision or bump of the external power source boxes does not occur even if a plurality of power tools are connected to an identical outside power supply. Further, the external power source box does not become an obstacle when using the power tool, thereby enhancing workability, since the external power source box can be dispensed with. Further, since the first region and the second region are cylindrical in shape, a user can easily grip the first portion and/or second portion thereby improving workability.

Preferably, the electric power tool further includes a switch protruding from a rear end portion of the housing in the axial direction.

In such a power tool, a switch protruding from a rear end portion of the grip portion in the axial direction is further provided. With this structure, in addition to the above-described function and effect, the switch does not protrude radially outwardly from the grip portion, but protrudes in the axial direction thereof. Therefore, the switch does not become an obstacle for gripping the grip portion, and accidental depression of the switch can be avoided when gripping the grip portion.

Preferably, the motor driver circuit includes a plurality of circuit boards.

With this structure, layout of the plurality of the boards within the grip portion can be easily achieved in comparison with a case where the motor driver circuit is provided by a single board. Therefore, efficient layout can be achieved avoiding generation of a dead space within the housing.

Preferably, each circuit board has a mount surface, at least one of the mount surfaces extending in a direction generally perpendicular to the axial direction of the grip portion.

With this arrangement, an axial length of the grip portion capable of accommodating the motor driver circuit can be reduced. Thus, a compact power tool with high operability can be provided.

Preferably, each circuit board has a mount surface, each of the mount surfaces extending in a direction generally perpendicular to the axial direction of the grip portion.

With this arrangement, an axial length of the grip portion capable of accommodating the motor driver circuit can be further reduced. Thus, a compact power tool with high operability can be provided.

Preferably, the brushless motor has an outer cross-sectional shape, and each circuit board has an outer profile generally similar to the outer cross-sectional shape.

With this structure, useless space within the grip portion can be diminished to reduce a diameter of the grip portion, thereby facilitating gripping of the grip portion, to thus enhance workability.

Preferably, each of the plurality of circuit boards has a generally disc-like shape and the plurality of circuit boards are arrayed generally coaxially with the brushless motor.

With this structure, useless space within the grip portion can be diminished to reduce a diameter of the grip portion, thereby facilitating gripping of the grip portion, to thus enhance workability.

Preferably, the grip portion defines a diametrical direction. Each circuit board is partly overlapped with an outer profile of the brushless motor as viewed from the axial direction.

With this structure increase in diameter of the grip portion can be restrained.

Preferably, the electric power further includes an end tool, a gear portion, and a power cord. The end tool is detachably attached at a side of a front end of the housing. The gear portion transmits driving force from the brushless motor to the end tool. The power cord extends from a rear end of the housing for supplying an external electrical power. The power cord, the motor driver circuit, the brushless motor, the gear portion, and the end tool being arranged in this order from the rear end to the front end.

With this structure, a center of gravity of the power tool can be positioned at the front side of the housing, facilitating balanced operation for the user to improve operability.

Preferably, the electric power tool further includes an end tool and a power cord. The end tool is provided at a side of a front end of the housing. The power cord extends from a rear end of the housing for supplying an external electrical power. The motor driver circuit includes a rectifying circuit, an inverter circuit, and a switching circuit board. The rectifying circuit is electrically connected to the power cord for rectifying the external electric power. The inverter circuit converts the rectified electric power into an inverter signal. The switching circuit board drives the brushless motor based on the inverter signal. The power cord, the rectifying circuit, the inverter circuit, the switching circuit board and the brushless motor are arranged in this order from the rear end to the front end.

With this structure, a wiring can be made in a direction from the power cord to the brushless motor. Thus, economical wiring can be achieved to provide a compact and highly operable power tool.

Preferably, the electric power tool further includes an end tool and a power cord. The end tool is provided at a side of a front end of the housing. The power cord extends from a rear end of the housing for supplying an external electrical power. The rear end portion of the housing is formed with an air inlet port. The front end portion of the housing is formed with an air outlet port. An air passage is defined in the housing from the air inlet port to the air outlet port. The motor driver circuit includes a switching board having a mount surface on which a switching element is surface-mounted. The switching element has a parallelepiped configuration provided with a largest area surface among six surfaces. The largest area surface extends in a direction generally parallel to a direction from the rear end to the front end.

With this structure, air introduced into the housing through the air inlet port flows toward the air outlet port along the air passage. That is, the air generally flows from the rear side to the front side of the housing. Further, the cooling air flows along the switching element surface having the most largest area. Thus cooling efficiency to the switching element can be improved to thus provide high output power tool.

Preferably, the housing has a guide portion positioned adjacent to the switching element. The air passage includes a space defined between the guide portion and the switching element.

With this structure, the guide portion can allow the cooling air to flow concentratedly along to the surface of the switching element. Therefore, cooling efficiency to the switching element can be improved to thus provide high output power tool.

Preferably, the switching board is formed with a through-hole in communication with the air passage.

With this structure, cooling air flowing along the air passage can be introduced into the switching element through the through-hole. Therefore, cooling efficiency to the switching element can be improved to thus provide high output power tool.

Preferably, the housing includes a front portion functioning as the grip portion and a rear portion including a tail cover positioned rearward of the grip portion. The brushless motor is disposed in the grip portion. The motor driver circuit is accommodated in the tail cover. The grip portion has an outer diameter ranging from 30 mm to 45 mm smaller than an outer diameter of the tail cover. The output shaft is a spindle positioned at a front side of the housing for holding an end bit. A rotation of the drive shaft is transmitted to the output shaft to provide a disc grinder.

With this structure, the grip portion has the outer diameter capable of facilitating gripping, so that a user can easily grip the grip portion with a single hand without an employment of a side handle during grinding operation.

Preferably, the brushless motor includes a rotor and a stator. The rotor has a permanent magnet and is disposed over the drive shaft. The stator includes a stator core provided at a radially outer side of the rotor and disposed in the grip portion, and a coil wound over the stator core. The stator core has an outer diameter and an axial length. A ratio of the outer diameter to the axial length is in a range of from 1:1.2 to 1:2.1.

With this structure, a resultant disc grinder can exhibit sufficient output in spite of a reduced diameter of the housing.

Preferably, the housing further includes a large diameter portion continuous with the grip portion and has an outer diameter greater than the outer diameter of the grip portion. The electric power tool further includes a fan disposed in the large diameter portion and coaxially mounted on the drive shaft at a position between the brushless motor and the spindle. The stator and the rotor are disposed in the grip portion.

With this structure, a resultant power tool can provide the grip portion having a reduced diameter without lowering a performance of the fan.

Preferably, the electric power tool further includes a gear cover having an opening connected to the housing. The drive shaft and the spindle are drivingly connected within a space of the gear cover. The opening has an inner diameter greater than the outer diameter of the grip portion.

With this structure, a compact housing can be provided without any reduction in side with respect to a power transmission mechanism including the spindle.

Preferably, wherein the motor driver circuit includes a switching element that drives the brushless motor; and a circuit board on which the switching element is installed. The switching element and the circuit board are accommodated in the tail cover.

With this structure, the grip portion only accommodates therein the brushless motor, so that the grip portion having a reduced outer diameter can be provided.

Preferably, the brushless motor includes a rotor and a stator. The rotor has a permanent magnet and is disposed over the drive shaft. The stator includes a stator core provided at a radially outer side of the rotor and disposed in the grip portion, and a coil wound over the stator core. The circuit board has an outer diameter greater than an outer diameter of the rotor, and extends in a direction substantially perpendicular to the drive shaft. The switching element is positioned radially outwardly of the rotor.

With this structure, enlargement of the housing in its axial direction is not required in order to install the switching element.

Preferably, the motor driver circuit further includes an inverter circuit, and an inverter circuit board that installs the inverter circuit. The tail cover includes a first complementary half, and a second complementary half fixed thereto. The inverter circuit board is nippingly fixed between the first complementary half and the second complementary half.

With this structure, assembleability can be improved.

Preferably, the motor driver circuit further includes a rectifier circuit, and a power source board installing the rectifier circuit and positioned in the tail cover. The inverter circuit board and the power source board extend in a direction perpendicular to the drive shaft.

With this structure, the circuit board can be effectively disposed in the tail cover while realizing the grip portion having a reduced diameter.

Preferably, the housing includes a front portion functioning as the grip portion and a rear portion including a tail cover positioned rearward of the grip portion. The brushless motor is disposed in the grip portion. The motor driver circuit is accommodated in the tail cover. The grip portion has an outer diameter ranging from 30 mm to 45 mm. The output shaft is a spindle positioned at a front side of the housing for holding an end bit. A rotation of the drive shaft is transmitted to the output shaft to provide a disc grinder. The brushless motor is designed to consume an electric power ranging from 200 W to 1400 W to provide a disc grinder.

With this structure, the grip portion can be easily gripped, and appropriate pressure can be applied from the disc grinder to a workpiece to enhance grinding efficiency.

Preferably, the grip portion has an outer diameter ranging from 35 mm to 40 mm.

With this structure, grippability to the grip portion can be further improved.

Preferably, the brushless motor exhibits the electric power consumption ranging from 600 W to 1000 W.

With this structure, a disc grinder having an optimum size of grip portion and providing an optimum output can be provided.

Preferably, the brushless motor includes a rotor and stator. The rotor has a permanent magnet and is disposed over the drive shaft. The stator includes a stator core provided at a radially outer side of the rotor and disposed in the grip portion, and a coil wound over the stator core. The stator core has an axial length ranging from 15 mm to 248 mm.

With this structure, a disc grinder exhibiting power consumption ranging from 200 W to 1400 W can be realized with a limited outer diameter of the grip portion ranging from 30 mm to 45 mm.

Preferably, the axial length of the stator core ranges from 19 mm to 182 mm.

With this structure, a disc grinder exhibiting power consumption ranging from 600 W to 1000 W can be realized with a limited outer diameter of the grip portion ranging from 35 mm to 40 mm.

Preferably, the motor driver circuit further includes a switching element, and an inverter circuit board that installs the switching element. The inverter circuit board is accommodated in the tail cover. The tail cover has an outer diameter greater than an outer diameter of the grip portion.

With this structure, a sufficient space for installing the circuit board can be obtained. Further, various kinds of switching elements can be selected for the inverter circuit because of the sufficient space, and sufficient heat releasing effect can be obtained.

Preferably, the electric power consumption of the brushless motor is greater than or equal to 600 W, and a quotient obtained by dividing the electric power consumption by an outer diameter of the housing is greater than or equal to 180 W/mm.

With this structure, a disc grinder providing greater output of the brushless motor can be obtained with respect to the diameter of the housing.

Preferably, the electric power tool further includes a gear cover and a motor support member. The gear cover is provided at a front side of the housing. An end bit protrudes from the gear cover. The motor support member is connected to the gear cover. The housing has an inner surface provided with an abutment portion protruding radially inwardly from the inner surface. The brushless motor has a rear end in abutment with the abutment portion and has a front end in abutment with the motor support member, whereby the brushless motor is fixedly interposed between the abutment portion and the motor support member to provide a disc grinder.

With this structure, a specific fixing part or component for fixing the motor at its axial direction is not required, and a housing having a small diameter can be provided.

Preferably, the housing further includes a large diameter portion at a front portion thereof, the large diameter portion having a diameter greater than that of a remaining portion of the housing. The electric power tool further includes a fan disposed in the large diameter portion and coaxially mounted on the drive shaft. The motor support member is disposed along an inner peripheral surface of the large diameter portion.

With this structure, the motor can be fixed without any affection to the position of the fan.

Preferably, the motor includes a plurality of core segments, a combination of the plurality of core segments providing a cylindrical stator core. Each of the core segments has a rear end in abutment with the abutment portion.

With this structure, all core segments can be aligned with each other without any displacement of a specific core segment because of the abutment with the abutment portion.

Preferably, the housing includes a front portion functioning as the grip portion and a rear portion including a tail cover positioned rearward of the grip portion. The brushless motor is disposed in the grip portion. The motor driver circuit is accommodated in the tail cover. The grip portion has an outer diameter ranging from 30 mm to 45 mm. The output shaft is a spindle positioned at a front side of the housing for holding an end bit. A rotation of the drive shaft is transmitted to the output shaft to provide a disc grinder. The electric power motor further includes a bearing held in the housing for rotatably supporting the drive shaft; and a sensor for detecting a rotation of the drive shaft. The tail cover is divided into a plurality of cover sections providing the cylindrical shape in combination thereof. The sensor is disposed within the tail cover to provide a disc grinder.

With this structure, the disc grinder can be easily assembled, since the sensor associated with the brushless motor is provided in the tail cover which is a region different from the region of the grip portion where the brushless motor is accommodated.

Preferably, the sensor includes a permanent magnet fixed to the drive shaft; and a hall element supported to the tail cover.

With this structure, detection of rotation of the drive shaft can be performed at high accuracy, and the hall element can be easily fixed or supported to the tail cover.

Preferably, the tail cover has an outer diameter greater than the outer diameter of the grip portion.

With this structure, an axial length of the tail cover can be reduced, to thus realizing high operability of the disc grinder.

Preferably, the plurality of cover sections includes a right half cover and a left half cover fixed to the right half cover. The right half cover and the left half cover are fixed to the grip portion upon fixing the left half cover to the right half cover.

With this structure, the tail cover can be easily fixed to the grip portion.

Preferably, the motor driver circuit includes an inverter circuit board.

With this structure, a compact disc grinder can be provided.

In another aspect of the invention, there is provided an electric power tool including a housing, a brushless motor, a motor driver circuit, and a switch. The housing has a generally cylindrical grip portion. The brushless motor is disposed in the grip portion and has a drive shaft. The motor driver circuit is accommodated in the grip portion for driving the brushless motor. The switch protrudes from a rear end portion of the grip portion in an axial direction of the grip portion.

With this structure, in addition to the above-described function and effect, the switch does not protrude radially outwardly from the grip portion, but protrudes in the axial direction thereof. Therefore, the switch does not become an obstacle for gripping the grip portion, and accidental depression of the switch can be avoided when gripping the grip portion.

In still another aspect of the invention, there is provided a disc grinder including: a motor housing having a grip portion; a brushless motor having a drive shaft and accommodated in the grip portion; a spindle provided at a front side of the motor housing and extending in a direction perpendicular to the drive shaft, a rotation of the drive shaft being transmitted to the spindle, and an end bit being held at the spindle; a tail cover provided at a rear side of the motor housing, the grip portion having an outer diameter ranging from 30 mm to 45 mm smaller than an outer diameter of the tail cover; and, a power source circuit accommodated in the tail cover.

With this structure, the grip portion has the outer diameter capable of facilitating gripping, so that a user can easily grip the grip portion with a single hand without side handle during grinding operation.

In still another aspect of the invention, there is provided a disc grinder including: a motor housing having a grip portion; a brushless motor having a drive shaft and accommodated in the grip portion, the brushless motor exhibiting an electric power consumption ranging from 200 W to 1400 W; a spindle provided at a front side of the motor housing and extending in a direction perpendicular to the drive shaft, a rotation of the drive shaft being transmitted to the spindle, and an end bit being held at the spindle; a tail cover provided at a rear side of the motor housing, the grip portion having an outer diameter ranging from 30 mm to 45 mm; and, a power source circuit accommodated in the tail cover.

With this structure, the grip portion can be easily gripped, and appropriate pressure can be applied from the disc grinder to a workpiece to enhance grinding efficiency.

In still another aspect of the invention, there is provided a disc grinder including: a motor; a cylindrical housing accommodating therein the motor; a gear cover connected to a front side of the housing; and an end bit protruding from the gear cover; and a motor support member connected to the gear cover, and, wherein the housing has an inner surface provided with an abutment portion protruding radially inwardly from the inner surface, the motor having a rear end in abutment with the abutment portion and having a front end in abutment with the motor support member, whereby the motor is fixedly interposed between the abutment portion and the motor support member.

With this structure, a specific fixing part or component for fixing the motor at its axial direction is not required, and a housing having a small diameter can be provided.

In still another aspect of the invention, there is provided a disc grinder including: a motor housing having a cylindrical shape; a brushless motor having a drive shaft and accommodated in the motor housing; a spindle provided at a front side of the motor housing and extending in a direction perpendicular to the drive shaft, a rotation of the drive shaft being transmitted to the spindle, and an end bit being held at the spindle; a tail cover provided at a rear side of the motor housing, the tail cover being constituted by a plurality of divided cover sections; a power source circuit disposed in the tail cover; a bearing held in the motor housing for rotatably supporting the drive shaft; and, a sensor disposed within the tail cover for detecting a rotation of the drive shaft.

With this structure, the disc grinder can be easily assembled, since the sensor associated with the brushless motor is provided in the tail cover which is a component different from the motor housing where the brushless motor is accommodated.

Figure 1:
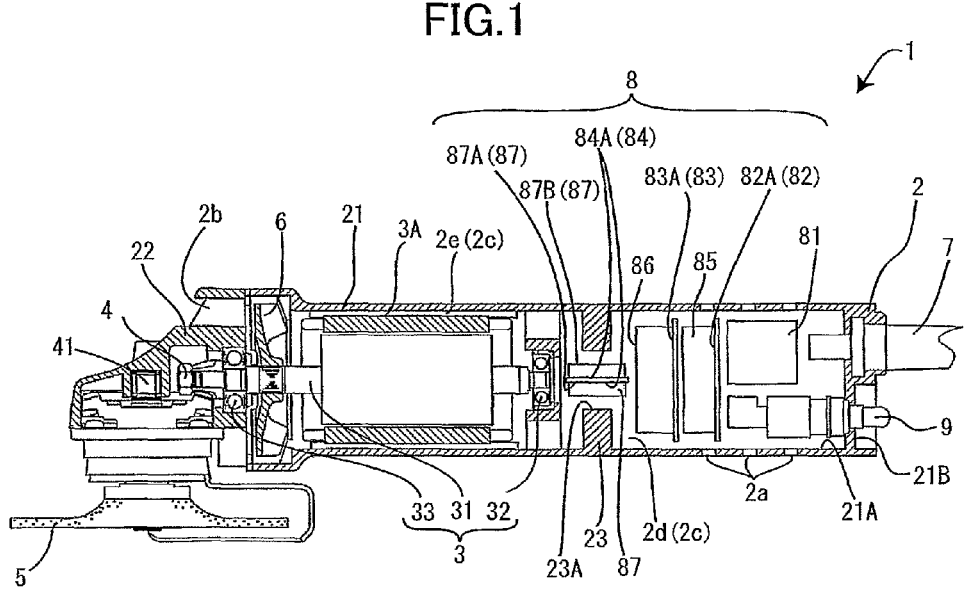
FIG. 1 is a cross-sectional view of a disc grinder as a first embodiment of a power tool according to the present invention.

DESCRIPTION OF REFERENCE NUMERALS 1, 101, 201, 301, 401, 501: disk grinder
2, 202, 302: housing
2a, 527: air inlet port
2b, 503a: air outlet port
2c: air passage
2d: first passage
2e: second passage
3, 506: motor
3A: outer peripheral surface
4: gear portion
5: grinding stone
6: fan
7: power cord
8, 108, 208, 308: motor driver circuit
9: switch
21, 221, 321, 421, 502A: grip portion
21A: inner peripheral surface
21B: rear end portion
22, 503: gear cover
23: guide portion
23A: guide surface
31: drive shaft
32, 33, 518a, 518b: bearing
41: output shaft
81: smoothing capacitor
82, 525: power source board
82A: mount surface
83: control board
83A: mount surface
84, 184, 284: FET board
84A, 184A, 284A: mount surface
85: power source portion
86: control portion
87, 187, 287: FET
87A, 187A, 287A: mounted surface
87B, 187B, 287B: cooling surface
284a: through hole
322: first housing section
323: second housing section
408: circuit board
502: motor housing
502a: rib
502b: abutment portion
504: tail cover
504-1: right half cover
504-2: left half cover
507: power switch
508: power cord
509: wheel guard
510: grinding wheel
511: lock pin
512: stator core
513: core segment
513a: recessed engagement face
513b: groove
513c: protruding engagement face
513d: teeth portion
514: coil
515: permanent magnet
516: rotor core
517: rotation shaft
519: cooling fan
520a, 528: screws
520b: thread hole
521: sensor magnet
522: switching element
523: rotational position detecting element
526: rectification circuit
529: first bevel gear
530: second bevel gear
531: spindle bevel gear
532: motor support member
532a: small diameter portion
532b: conical portion
532c: large diameter portion
533: attachment bosses

DESCRIPTION OF EMBODIMENTS

Figure 2:
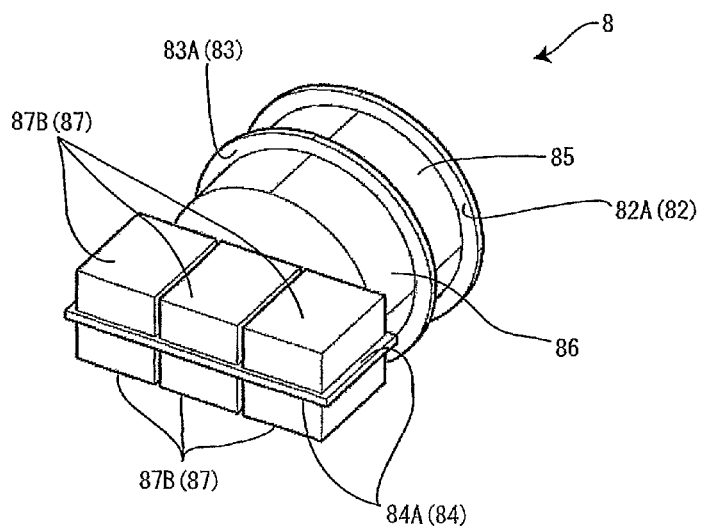
FIG. 2 is a perspective view of a motor driver circuit in the disc grinder according to the first embodiment.

A disc grinder as a first embodiment of a power tool according to the present invention will be described with reference to FIGS. 1 and 2. The disc grinder 1 generally includes a housing 2, a motor 3 accommodated in the housing 2, a gear portion 4 rotationally driven by the motor 3, a grinding stone 5 rotated by the gear portion 4, a fan 6, and a power cord 7. In the following description, the grinding stone side and the power cord side will be referred to as a front side and a rear side, respectively.

The housing 2 includes a grip portion 21 and a gear cover 22. The grip portion 21 accommodates therein the motor 3, the fan 6 and a motor driver circuit 8 controlling the motor 3. The grip portion 21 has a generally cylindrical shape and is constituted by a pair of complementary semi-cylindrical halves coupled to each other. In the grip portion 21, the motor 3, and the motor driver circuit 8 are fixed. The grip portion 21 has a rear portion formed with an air inlet port 2a for introducing an external air into an interior of the housing 2. The grip portion 21 has an inner peripheral surface 21A provided with a guide portion 23 having a guide surface 23A directly confronting with a cooling surface 87B of an EFT 87 (described later). An air outlet port 2b is formed at the gear cover 22, so that an air passage 2c is defined in the housing 2 between the air inlet port 2a and the air outlet port 2b. More specifically, the air passage 2c includes a first passage 2d in communication with the air inlet ports 2a and a second passage 2e in communication with the air outlet port 2b. The first passage 2d is defined between a surface of the motor driver circuit 8 and the inner peripheral surface 21A (including the guide surface 23A) of the grip portion 21, and a second passage 2e is defined between an outer peripheral surface 3A of the motor and the inner peripheral surface 21A of the grip portion 21. The grip portion 21 has a rear part provided with the power cord 7 and a switch 9. The power cord 7 is adapted for supplying electric power from an external power source (not shown) to the motor 3 through the motor driver circuit 8, and the switch 9 is adapted for controlling actuation and de-energization of the motor 3. The grip portion 21 has a rear end portion 21 from which the switch 9 protrudes rearward in an axial direction of the grip portion 21. The power cord 7 and the switch 9 are fixed by mating together the complementary semi-cylindrical halves of the grip portion 12.

The motor 3 has a generally cylindrical configuration and is a conventional inner rotor type brushless motor having a stator, a coil, a rotor, and a drive shaft 31 integrally rotated with the rotor. The outer peripheral surface 3A of the motor 3 has a part supported to the inner peripheral surface 21A of the grip portion 21. The outer peripheral surface 3A has a remaining part defining a space in cooperation with the inner peripheral surface 21A. The space is a part of the air passage 2e. The drive shaft 31 is rotatably supported to the housing 2 through a bearing 32 and a bearing 33 disposed in the grip portion 21 and the gear cover 22, respectively. The fan 6 is fixed to a front portion of the drive shaft 31. Upon rotation of the motor 3, the fan 6 is rotated integrally with the drive shaft 31 for introducing air into the housing 2 through the air inlet port 2a, so that a cooling air flow is generated in the housing 2. The cooling air flowing through the air passage 2c can be discharged outside out of the air outlet port 2b. That is, the cooling air flows along the air passage 2c frontward.

The gear cover 22 is formed with the air outlet port 2b, and has a part covering a half region of an outer peripheral surface of the grinding stone 5. The gear cover 22 accommodates therein the gear portion 4 including a pinion gear and an output shaft 41. The gear portion 4 is adapted for transmitting rotational force from the drive shaft 31 to the output shaft 41 for rotating the grinding stone 5. The output shaft 41 extends perpendicular to the drive shaft 31 and is rotated integrally with the grinding stone 5. The grinding stone 5 is detachable from the gear cover 22.

The motor driver circuit 8 will next be described. As shown in FIG. 1, the motor driver circuit 8 includes a smoothing capacitor 81, a power source board 82, a control board 83, and an FET board 84. These are arranged in this order from the rear side of the housing 2 (grip portion 21) toward the front side thereof.

The smoothing capacitor 81 is configured to smoothen power source voltage supplied from an external power source through the power cord 7, and is electrically connected to the power source board 82 through a wiring (not shown).

The power source board 82 has a disc shape having a diameter slightly smaller than a diameter of the motor 3 and is electrically connected to the switch 9 through a wiring (not shown). The power source board 82 has a mount surface 82A on which a power source portion 85 is surface-mounted. The power source portion 85 is connected to the power line 7 through the smoothing capacitor 81 for rectifying an electric power supplied from the external power source (not shown). For example, assuming that the source voltage smoothened by the smoothing capacitor 81 is AC 100V, the power source portion 85 performs rectification by converting the source voltage into about 18V. The power source board 82 is positioned concentrically with the motor 3, and the mounting surface 82A extends approximately perpendicular to an axial direction of the grip portion 12 (a direction of an axis of the drive shaft 31). The power source portion 85 can be referred to as a rectifying circuit.

The control board 83 has a disc shape having a diameter equal to that of the power source board 82 and slightly smaller than the diameter of the motor 3. The control board 83 is electrically connected to the power source board 82 through a wiring (not shown). The control board 83 has a mount surface 83A on which a control portion 86 is surface-mounted. The control portion 86 is configured to convert an electrical power rectified by the power source portion 85 into an inverter signal. The control board 83 is positioned concentrically with the motor 3 and the power source board 82, and the mounting surface 83A extends approximately perpendicular to the axial direction of the grip portion 12. The control portion 86 can be referred to as an inverter circuit.

The FET board 84 is of a generally rectangular shape, and has a pair of opposing mount surfaces 84A, 84A extending approximately parallel to the axial direction of the housing 2. The FET board 84 is electrically connected to the control board 83 through a wiring (not shown). Each mount surface 84A mounts three FETs 87 arrayed in line. These FETs 87 are electrically connected to a coil of the motor 3 through a wiring (not shown) so as to drive the motor 3 in accordance with the inverter signal transmitted from the control board 83. Each FET 87 has a generally parallelepiped configuration having a mounted surface 87A in contact with the mount surface 84A and the cooling surface 87B in confrontation with the mounted surface 87A. The mounted surface 87A and the cooling surface 87B have the largest area among six surfaces of the FET 87, and extend approximately parallel to the axial direction of the housing 2. Further, the FET board 84 is oriented so that the cooling surface 87B extends approximately parallel to the guide surface 23A of the guide portion 23. Further, the FET board 84 has a length approximately equal to the outer diameter of the motor 3. The FET board 84 can be referred to as a switching circuit or switching board.

Further, the profiles of the power source board 82, the control board 83 and the FET board 84 of the motor driver circuit 8 are positioned within the outer peripheral surface of the motor 3 in the radial direction of the grip portion 21 as viewed in the axial direction of the grip portion 21. Incidentally, the power source board 82, the control board 83 and the FET board 84 are fixed to the grip portion 21 when two complementary halves of the grip portions 21 are mated with each other.

Next, operation of the disc grinder 1 will be described. When the user turns the switch 9 ON, the motor 3 is rotated and the rotation is transmitted to the grinding stone 9 fixed to the output shaft 4 through the gear portion 4. On the other hand, when the user turns the switch OFF, the rotation of the motor is stopped to stop rotation of the grinding stone 9.

In the disc grinder 1 according to the above-described embodiment, an external power source box can be dispensed with between the disc grinder 1 and an external power source, since all components of the motor driver circuit 8 for driving the motor 3 are accommodated within the grip portion 21. Therefore, breakage of power source boxes due to collision therebetween does not occur even if a plurality of disc grinders 1 are connected to an identical external power source. Further, operability of the disc grinder can be improved, since the user is undisturbed by the power source boxes. Furthermore, the user can easily grip the grip portion 21 to enhance operability since the grip portion 21 has generally cylindrical shape.

The layout of the motor driver circuit 8 within the grip portion 21 can be improved, since the motor driver circuit 8 is constituted by a plurality of boards 82, 83, and 84) to enhance a degree of freedom in the layout of these board in comparison with a case where a motor driver circuit is provided on a single board. Thus, these boards can be efficiently arranged in the grip portion 21 to minimize a dead space therein.

Further, the grip portion can have a reduced length in the axial direction thereof for accommodating therein the motor driver circuit, since the mount surfaces 82A, 83A of the power source board 82 and the control board 83 extends approximately perpendicular to the axial direction of the grip portion 21. Thus, a compact disc grinder with high operability can result.

Further, the switch 9 protrudes rearward from the rear portion of the grip portion 21 in the axial direction of the grip portion. In other words, the switch 9 is not positioned radially outwardly of the grip portion 21. Accordingly, the switch 9 is not impeditive and erroneous manipulation to the switch can be eliminated when gripping the grip portion 21.

Further, each board of the motor driver circuit 8 is at least partially overlapped with the motor 3 in the radial direction of the grip portion 21 when viewing in the axial direction thereof. Therefore, increase in diameter of the grip portion 21 can be eliminated.

Further, the grinding stone 5 and the gear portion 4 those having a heavy weight are provided at a front portion of the disc grinder 1, so that a center of gravity of the disc grinder 1 can be positioned at the front portion. Accordingly, the user can perform balanced handling more easily in comparison with the case where a center of gravity is positioned at a rear portion of the disc grinder.

Further, since the power cord 7, the power source board 82, the control board 83, the FET board 84 and the motor 3 are arranged in this order from the rear side toward the front side, installation of a wiring can be made from the power cord 7 toward the motor 3, i.e., in the electrical power supplying direction. Thus, wasteful wire installation can be avoided and compact and highly operable disc grinder can be provided.

Further, cooling air introduced through the air inlet port 2a flows along the air passage 2c toward the air outlet port 2b. That is, the cooling air flows from the rear portion toward the front portion. In the illustrated embodiment, the cooling air flows along the cooling surface 87B of the FET 87 since the cooling surface 87B extends approximately parallel to the axial direction of the grip portion (rear to front direction). Accordingly, cooling efficiency to the FET 87 can be improved thereby providing a high output disc grinder.

The guide portion 23 is provided in the vicinity of the FET 87, and the first passage 2d of the air passage 2c includes a space between the guide portion 23 and the FET 87. By the guide portion 23 the cooling air can be concentrated at a position near the FET 87, thereby improving cooling efficiency to the FET 87. Consequently, high output disc grinder can be provided.

A disc grinder 101 according to a second embodiment of the present invention will be described with reference to FIGS. 3 and 4. The disc grinder 101 according to the second embodiment is similar to that of the first embodiment except a motor driver circuit 108 in place of the motor driver circuit 8.

Figure 3:
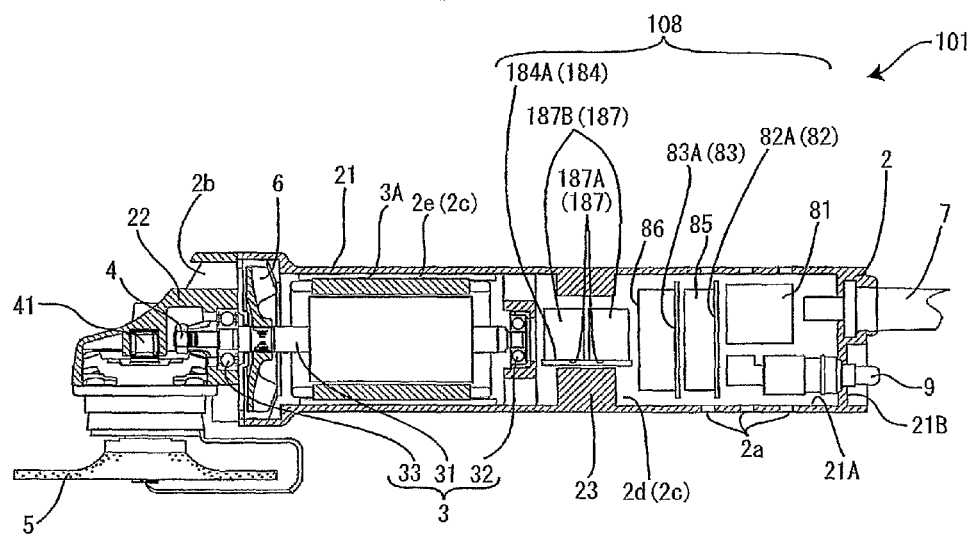
FIG. 3 is a cross-sectional view of a disc grinder as a second embodiment of a power tool according to the present invention.
Figure 4:
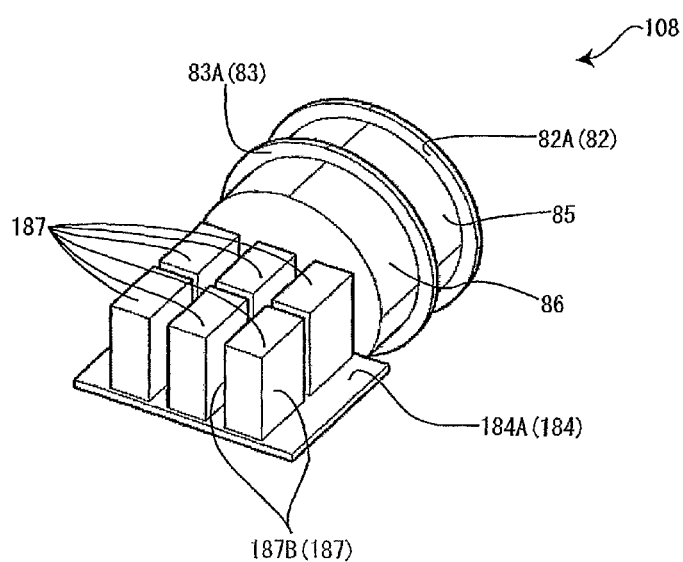
FIG. 4 is a perspective view of a motor driver circuit in the disc grinder according to the second embodiment.

As shown in FIGS. 3 and 4, the motor driver circuit 108 includes the power source board 82 surface-mounting the power source portion 85, the control board 83 surface-mounting the control portion 86, and an FET board 184 surface-mounting FETs 187. The FET board 184 is electrically connected to the control board 83 through a wiring (not shown). The FET board 184 has a generally rectangular shape having a mount surface 184A for surface-mounting six FETs 187. The mount surface 184A of the FET 184 extends approximately perpendicular to the mount surfaces 82A, 83A of the power source board 82 and the control board 83. In other words, the mount surface 184A extends approximately parallel to the axial direction of the grip portion 21. FETs 187 are electrically connected to the coil of the motor 3 through a wiring (not shown) for driving the motor 3 in accordance with inverter signal transmitted from the control portion 86. Each FET 187 has a parallelepiped configuration having a mounted surface 187A (FIG. 3) in contact with the mount surface 184A and two opposing cooling surfaces 187B having the largest area among six surfaces. These cooling surfaces 187B extend generally parallel to the rear to front direction of the housing 2. Incidentally, the power source board 82, the control board 83 and the FET board 184 are fixed to the grip portion 21 and so arranged therein upon mating the complementary semi-cylindrical halves of the grip portion 21. Such disc grinder 101 provides effect similar to that of the disc grinder 1 of the first embodiment.

A disc grinder 201 according to a third embodiment of the present invention will be described with reference to FIGS. 5 through 7. The disc grinder 201 is similar to the disc grinder 1 of the first embodiment except a housing 202, and a motor driver circuit 208. The housing 202 has a grip portion 221 which is the same as the grip portion 21 except that an inner peripheral surface 221A of the grip portion 221 is not provided with the guide portion 23.

Figure 5:
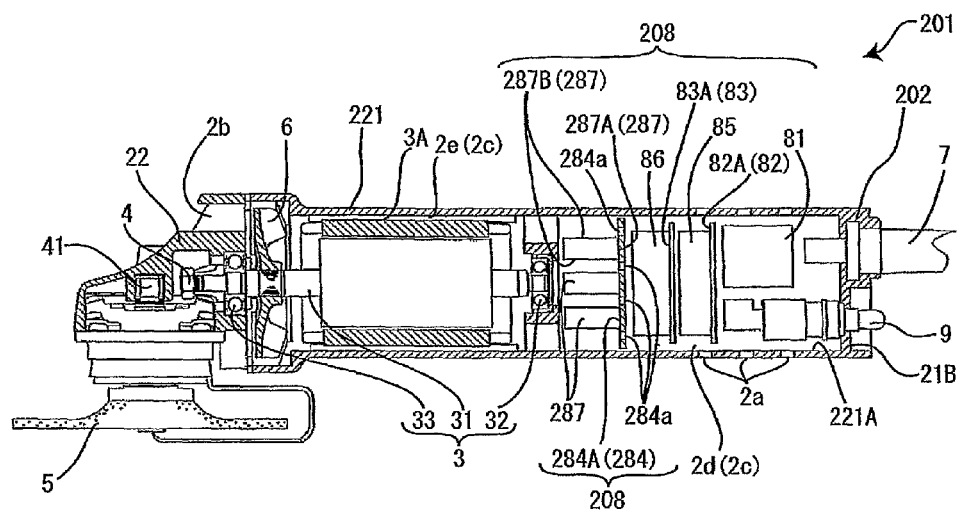
FIG. 5 is a cross-sectional view of a disc grinder as a third embodiment of a power tool according to the present invention.
Figure 6:
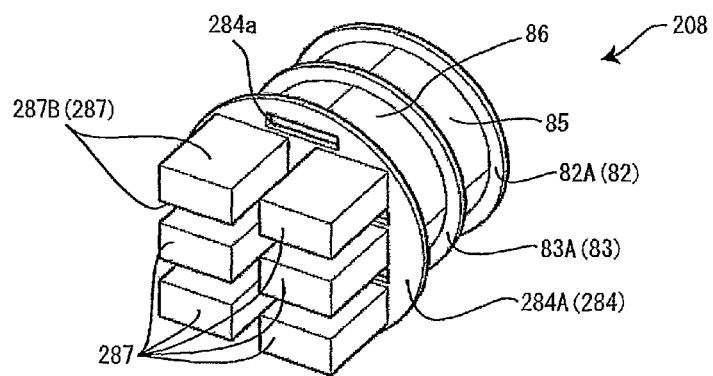
FIG. 6 is a perspective view of a motor driver circuit in the disc grinder according to the third embodiment.
Figure 7:
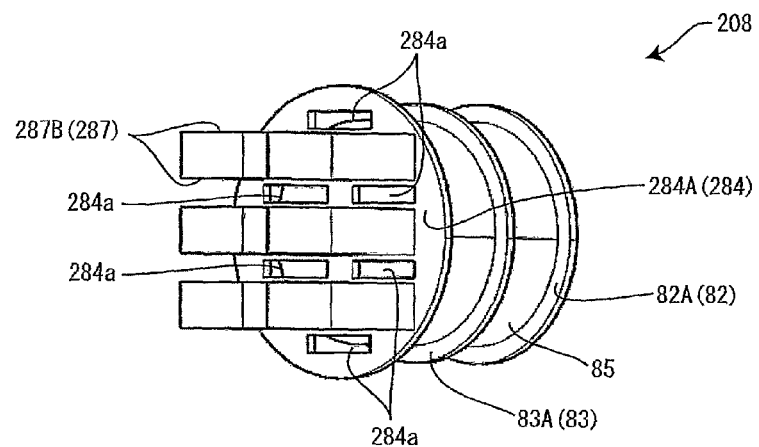
FIG. 7 is another perspective view of the motor driver circuit in the disc grinder according to the third embodiment as viewed from a direction different from that of FIG. 6.

As shown in FIGS. 5 through 7, the motor driver circuit 208 includes the power source board 82 surface-mounting the power source portion 85, the control board 83 surface-mounting the control portion 86, and an FET board 284 surface-mounting FETs 287. The FET board 284 is electrically connected to the control board 83 through a wiring (not shown). Similar to the power source board 82 and the control board 83, the FET board 284 has a generally disc-like shape having a diameter approximately equal to the outer diameter of the motor 3. The FET board 284 has a mount surface 284A mounting six FETs 287. The FET board 284 is disposed approximately concentrically with the motor 3, so that the mount surface 284A extends approximately perpendicular to the axial direction of the grip portion 21 (axial direction of the drive shaft 31). The FETs 287 are electrically connected to the coil of the motor 3 through a wiring (not shown) for driving the motor 3 in accordance with inverter signal transmitted from the control portion 86. Each FET 287 has a parallelepiped configuration having a mounted surface 287A in contact with the mount surface 284A and a pair of cooling surfaces 287B having the largest area among six surfaces. Two rows of FETs 287 are mounted on the mount surface 284A, and each row includes three FETs 287 arrayed in a vertical direction in FIG. 6. The cooling surfaces 287B of the neighboring FETs 287 in the identical row are in direct confrontation with each other, and extend in a direction approximately parallel to rear-to front direction of the housing 202 (axial direction of the grip portion 221). The power source board 82, the control board 83 and the FET board 284 are fixed to the grip portion 221 and so arranged therein upon mating the complementary semi-cylindrical halves of the grip portion 221. The FET board 284 is formed with six rectangular through-holes 284a in communication with the air passage 2c (2d). Each through-hole 284a has a longitudinal side extending parallel to the cooling surface 287B to allow cooling air to pass along the cooling surfaces 287B.

According to the disc grinder 201, each mount surface 82A, 83A 284A of each board 82, 83 and 284 of the motor driver circuit 208 is oriented in a direction approximately perpendicular to the axial direction of the grip portion 221. Therefore, an axial length of the grip portion 221 for accommodating the motor driver circuit 208 can be reduced. Thus, a compact disc grinder capable of providing sufficient operability can be provided.

Further, since the profile of each board 82, 83, 284 of the motor driver circuit 208 is approximately the same as a cross-sectional shape of the motor 3, dead space in the grip portion 221 can be eliminated or reduced to reduce the outer diameter of the grip portion 221. Thus, the grip portion 221 can be easily gripped by the user to improve workability or operability.

Further, since all boards 82, 83, 284 of the motor driver circuit 208 are approximately concentric with the motor 3, dead space in the grip portion 221 can be eliminated or reduced to reduce the outer diameter of the grip portion 221. Thus, the grip portion 221 can be easily gripped by the user to improve workability or operability.

Further, since the through-holes 284a are formed in the FET board 284, cooling air flowing through the air passage 2c (2d) can be applied to the FETs 287 through the through-holes 284a. Thus, high output disc grinder can be provided.

Figure 8:
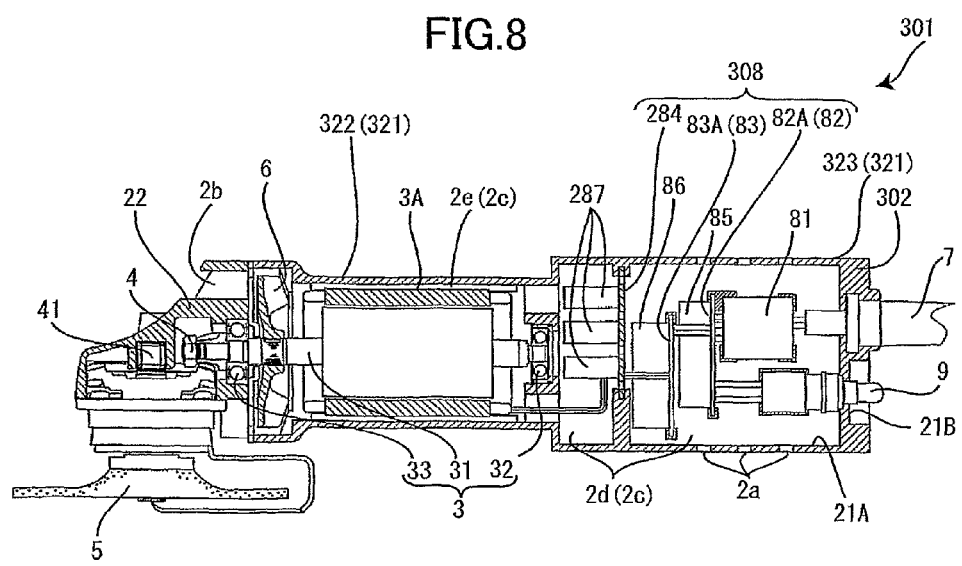
FIG. 8 is a cross-sectional view of a disc grinder as a fourth embodiment of a power tool according to the present invention.

FIG. 8 shows a disc grinder 301 according to a fourth embodiment of the present invention. According to the fourth embodiment, the power source board 82, the control board 83, and the FET board 284 are offset from each other and are partly overlapped with the motor 3 in a radial direction of a grip portion 321 of a housing 302 as viewed in an axial direction of the grip portion 321. This structure is different from that of the third embodiment where these boards are concentric with the motor 3. The grip portion 321 includes a first housing section 322 for housing the motor 3, and a second housing section 323 having a diameter greater than that of the first housing section 322 for housing the motor driver circuit 308. These boards 82, 83, 284 are fixed to the grip portion 321 by mating together complementary semi-cylindrical halves of the grip portion 231. Further, respective wirings are provided for electrical connections between the power cord 7 and the power source board 82, between the switch 9 and the power source board 82, between the power source board 82 and the control board 83, between the control board 83 and the FET board, and between the FET 287 and the coil of the motor 3. According to the disc grinder 301, increase in an outer diameter of the grip portion 321 can be restrained in comparison with a case where each board of a motor driver circuit is positioned radially outwardly of the motor 3.

Figure 9:
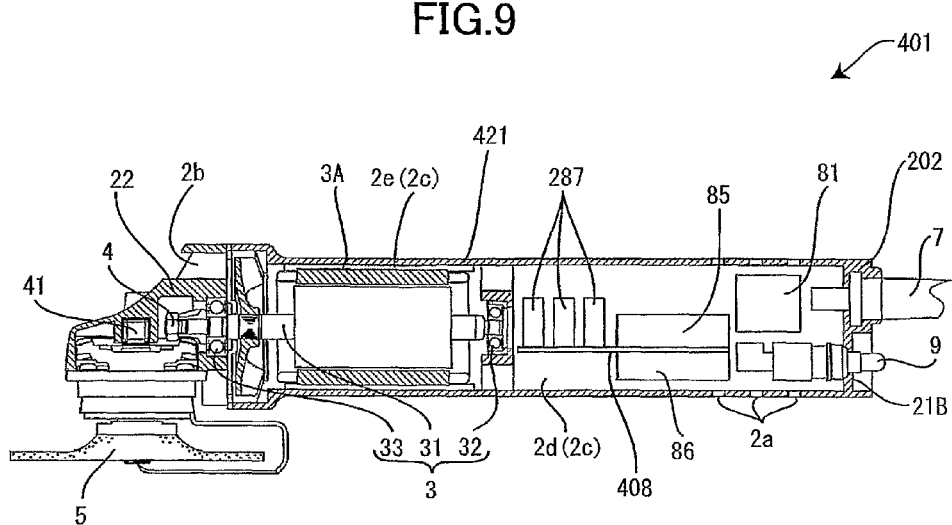
FIG. 9 is a cross-sectional view of a disc grinder as a fifth embodiment of a power tool according to the present invention.
Figure 10:
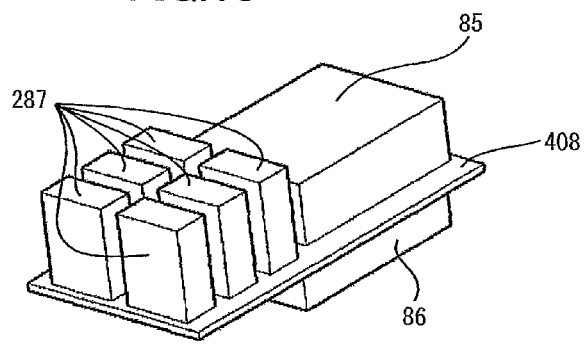
FIG. 10 is a perspective view of the disc grinder as the fifth embodiment and particularly showing a motor driver circuit.
Figure 11:
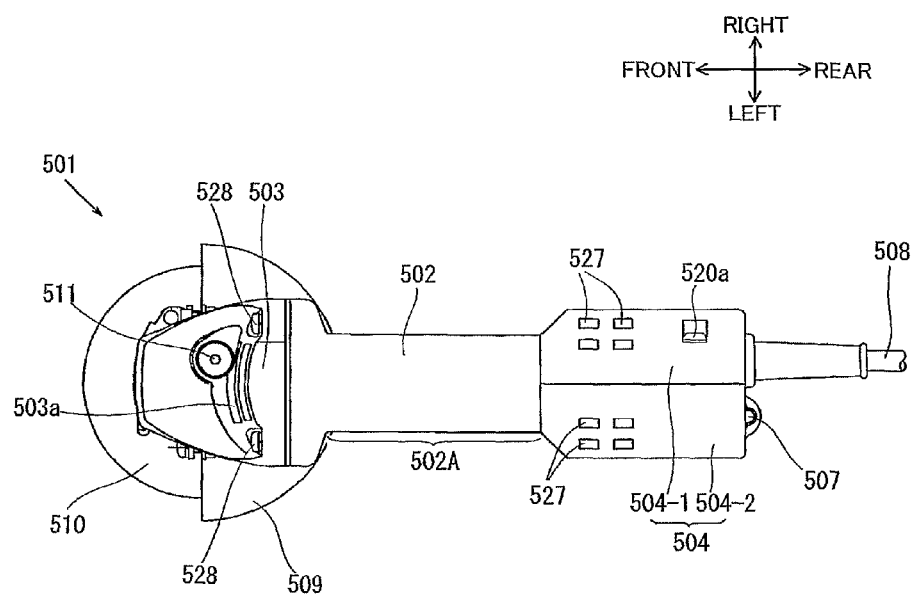
FIG. 11 is a plan view of a disc grinder as a sixth embodiment of the present invention.
Figure 12:
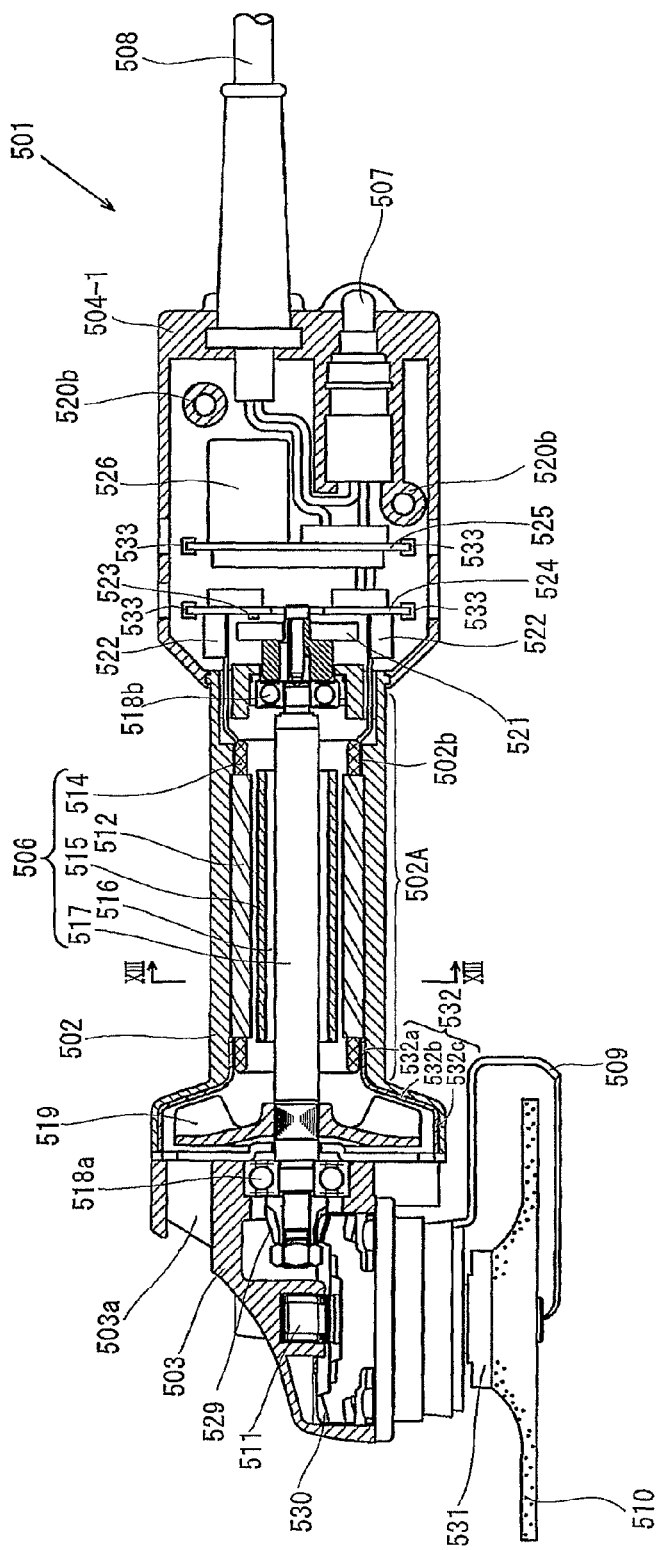
FIG. 12 is a cross-sectional view of the disc grinder shown in FIG. 11.

FIGS. 9 and 10 show a disc grinder 401 according to a fifth embodiment of the present invention. In the fifth embodiment, a single circuit board 408 is provided on which the power source portion 85, the control portion 86 and the FET 287 are surface-mounted. The circuit board 408 is fixed to the grip portion 421 by mating together complementary semi-cylindrical halves of the grip portion 421. The power cord 7 is electrically connected to the circuit board 408 through a wiring (not shown), and the switch 9 is electrically connected to the circuit board 408 through a wiring (not shown). In the fifth embodiment, efficient accommodation of the motor driver circuit within the housing 202 may not be achievable but a dead space may be provided. Accordingly, the grip portion 221 must provide an elongated axial length. In this point of view, the motor driver circuit should be divided into a plurality of boards.

Next, a disc grinder according to a sixth embodiment of the present invention will be described with reference to FIGS. 11 to 19. The sixth embodiment is the same as the foregoing embodiments in that the brushless motor is accommodated in the grip portion of the housing, and the motor driver circuit is accommodated in the housing. However, the sixth embodiment provides improvements on operability and grinding performance of the disc grinder.

Figure 20:
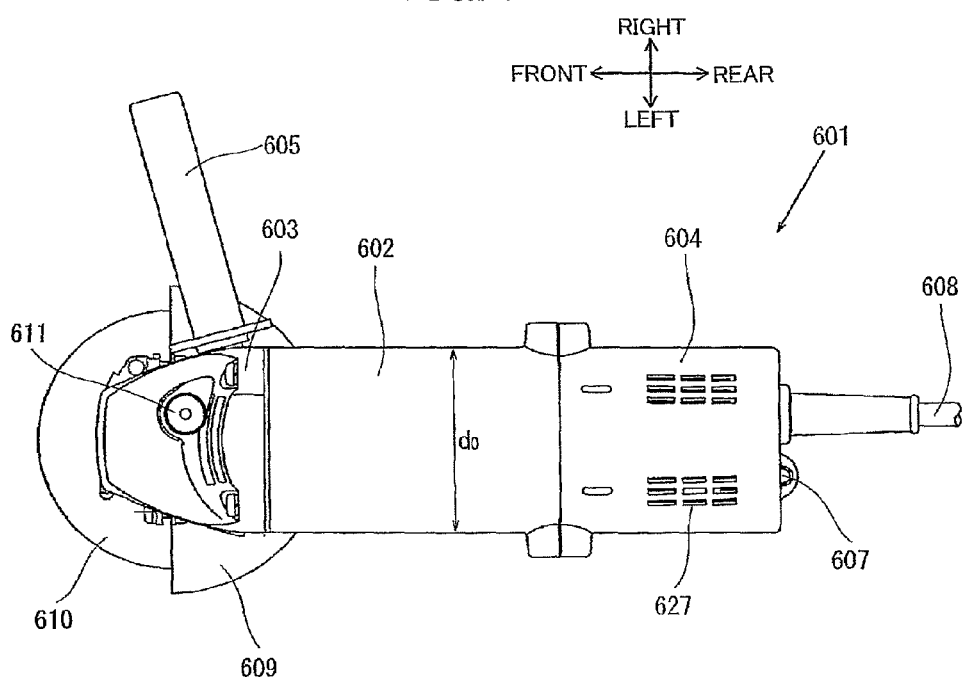
FIG. 20 is a plan view of a conventional disc grinder.

More specifically, in a conventional disc grinder 601 shown in FIG. 20, there is provided a motor housing 602 for housing a motor as a drive source. A tail cover 604 formed with a plurality of air intake ports 627 is provided at a rear end of the motor housing 602. The tail cover 604 is provided with a power cord 608 to be electrically connected to an external power source and a power switch 607 adapted to turn ON/OFF the electrical power. The motor housing 602 has a front side provided with a gear cover 603 accommodating therein a power transmission mechanism that converts a power transmitting direction defined by a rotation shaft of the motor into about 90 degrees. Within the gear cover 603, a spindle (not shown) is provided to which a grinding wheel 610 is attached. Further, a lock pin 611 is provided for preventing the spindle from being rotated during exchange of the grinding wheel with a new wheel.

Various types of motors are available for the disc grinder 601, and among these motors, an AC motor having an outer diameter not less than 50 mm is widely used taking a necessary output power into consideration. In this connection, an outer diameter $d_0$ of the motor housing 602 accommodating therein the motor should have a minimum outer diameter of about 56 mm. In such a disc grinder 601, the motor housing 602 is not available as a grip portion, and has a smooth outer surface without any patterned indentation.

A handle 605 is detachably attached to a side portion of the gear cover 603. In FIG. 20, the handle 605 is attached to a right side of the gear cover 603. However, the handle 605 can also be attached selectively to a left side of the gear cover 603. Because of the attachment of the handle 605, a user grips the handle 605 with his right hand, and presses one of the motor housing 602 and the tail cover 604 with his left hand for grinding work. In this way, the handle 605 can assist holding the disc grinder body. However, the disc grinder with the handle may not be operated at a narrow working site, since the handle 605 largely protrudes from the body of the disc grinder 601.

Figure 21:
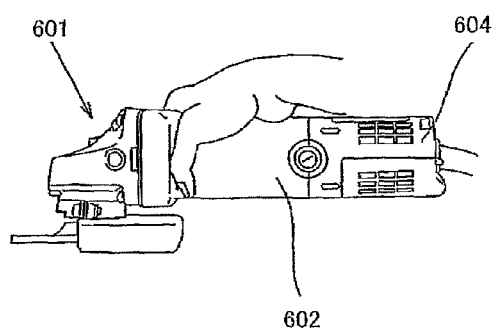
FIG. 21 is view for description of one-hand gripping to the conventional disc grinder.

On the other hand, a single hand gripping to a motor housing 602 may be conceivable as shown in FIG. 21 without any attachment to the handle. However, gripping to the motor housing 602 is not easy due to a large diameter of a motor housing 602 to degrade stabilization of grinding working. There is a publication of "Data collection of anthropometric dimension for design purpose" edited by National Institute of Bioscience and Human-Technology, Agency of Industrial Science and Technology, Ministry of International Trade and Industry, published by "Research institute of Human Engineering for Quality Life" on September 1999. Page 199 of the publication discloses data of a diameter of a circle provided by contacting a tip end of a thumb with a tip end of an index finger of an adult male and female, and discloses an average diameter of 39.7 mm. Therefore, if the diameter of the motor housing 602 approximates the average diameter, a user can sufficiently grip the motor housing in a state where tip ends of a thumb and an index finger are in contact with each other, thereby enhancing workability. However, the disc grinder 601 shown in FIG. 20 cannot be gripped with a sufficient force since the diameter $d_0$ of the motor housing 602 is 56 mm at minimum.

Japanese Patent Application Publication No. 2001-150366 discloses a motor housing having a constricted region whose outer diameter is smaller than an outer diameter of a stator of a motor. An elongated rotation shaft is provided, so that a body of a motor is displaced rearward. The constricted region is positioned at a part of the motor housing at a position between a cooling fan and the motor body. In this way, user's thumb and the index finger can be placed over the constricted region. According to another type of a motor housing, a stator is divided into a front stator part and a rear stator part, so that a constricted region can be positioned between the front and rear stator parts.

The disc grinder described in the JP publication can be suitably used because the user can successfully grip the constricted region with his thumb and index finger. However, these fingers will fatigue if prolonged grinding work is performed. Particularly, recent disc grinder employs heavy motor to provide high power consumption in order to realize increased working speed.

Further, according to the disc grinder disclosed in the JP publication, motor shaft should be elongated and the motor stator must be positioned offset from the constricted region so as to avoid interference with the constricted region. Thus, the motor body must be positioned at a rear portion, to thus degrade weight balance. If the motor stator is divided into the front stator and rear stator, effective area of the stator is reduced. Therefore, sufficient rotational torque cannot be obtained in proportion to the size of the rotor. Further, since the employed motor is the DC brush motor, a compact motor capable of providing high rotational torque cannot be realized.

However, a disc grinder 501 according to the sixth embodiment has a housing including a motor housing 502 accommodating therein a brushless DC motor 506, a gear cover 503, and a tail cover 504 positioned at a front side and a rear side of the motor housing 502, respectively. The motor housing 502 has a grip portion (thinner portion) 502A having a size smaller than that of the gear cover 503 and the tail cover 504, the size being one of a diameter, a height and a width. The motor housing 502 has a fat portion at a front side of the thinner portion 502A. In the fat portion, a fan accommodating space is provided for accommodating therein a cooling fan 519. The motor housing 502 is integrally molded product made from a polymer resin such as polycarbonate. The fat portion has a radially outer portion formed with thread holes (not shown) extending in frontward/rearward direction.

The gear cover 503 is fixed to the fat portion by a plurality of screws 528 threadingly engaged with the thread holes of the fat portion from its front side. The gear cover 503 is an integrally molded product made from a metal such as aluminum, and is formed with an air outlet port 503a. Within the gear cover 503, a spindle 531 (outputs shaft), and a power transmission mechanism including a first bevel gear 529 and a second bevel gear 530 are provided. These gears 529 and 530 are rotated by the rotation of the motor 506, so that a grinding wheel 510 supported to the spindle 531 is drivingly rotated. A wheel guard 509 is disposed around the grinding wheel 510 for protecting a user against grounded material released from the workpiece or abrasive grain released from the grinding wheel 510.

The tail cover 504 is divided into a right half cover 504-1 and a left half cover 504-2 fixed to each other by a plurality of screws 520a. More specifically, the right half cover 504-1 is formed with two thread holes 520b, and the left half cover 504-2 has a thread boss (not shown). The screws 520a are inserted through the thread holes 520b and are threadingly engaged with the thread boss, so that the right and left halves 504-1, 504-2 can be fixed to the motor housing 502. That is, the right half cover 504-1 and the left half cover 504-2 are fixed to the motor housing 502 (grip portion) upon fixing the left half cover 504-2 to the right half cover 504-1. A power cord 508 extends outward from the tail cover 504, and a power switch 507 is provided at the tail cover 504. The tail cover 504 has an outer peripheral portion formed with a plurality of air inlet ports 527.

A grinding wheel has a diameter of for example, 100 mm, and a resinoid flexible grinding wheel, a flexible grinding wheel, a resinoid grinding wheel, an a sanding wheel are examples of the grinding wheel 510 for performing flat or curved surface grinding with respect to a metal object, synthetic resin object, a marble object, and a concrete object while selecting a kind of abrasive grain. Maximum rotation speed of the grinding wheel 510 is for example, 4300 rpm.

The brushless DC motor 506 has an elongated configuration extending in an axial direction, and has an entire axial length capable of being accommodated in the grip portion 502A. The motor 506 is a three-phase brushless DC motor including a stator core 512 having generally hollow cylindrical shape, and a rotor disposed within the stator core 512 and coaxially therewith. Coils 514 (armature windings) including three-phase wires U,V,W are wound over the stator core 512. The rotor is disposed inside the stator core 512, and includes a rotation shaft 517, a rotor core 516 attached to the outer peripheral surface of the rotation shaft 517, and a cylindrical permanent magnet 515 having N-pole and S-pole. A hollow cylindrical neodymium sintered magnet is available as the magnet 515 for a thin walled cylinder leading to reduction in diameter of the motor 506.

A motor support member 532 is provided for fixing the motor 506 to an inner peripheral surface of the motor housing 502 at a front side of the motor 506. The motor support member 532 is coaxial with the motor 506 and has a small diameter portion 532A, a conical portion 532b and a large diameter portion 532c arranged in this order toward front side. The small diameter portion 532A is in abutment with a front end face of the stator core 512. The conical portion 532b has a diameter gradually increasing toward the front side, so that the conical portion 532b can extend along an inner peripheral surface of the fan chamber. The large diameter portion 532c is in abutment with a rear end face of the gear cover 503.

The rotation shaft 517 is rotatably supported to the housing by a front bearing 518a fixed to the gear cover 503 and a rear bearing 518b fixed to the motor housing 502. The cooling fan 519 is concentrically fixed to the rotation shaft 517 and is disposed at a position between the front bearing 518a and the rotor core 516. The cooling fan 519 is made from a plastic material. Upon rotation of the motor 506, the cooling fan 519 is rotated, so that an air is introduced into the housing through the air inlet ports 527 and the air flows along a switching element (described later) and the motor 506 and is discharged outside through the air outlet port 503a.

The first bevel gear 529 is fixed to a front end of the rotation shaft 517, and the second bevel gear 530 is fixed to an upper end portion of the spindle 531 and is meshingly engaged with the first bevel gear 529. The second bevel gear 530 has a diameter and a gear teeth number greater than those of the first bevel gear 529. Thus, the power transmission mechanism also functions as a deceleration mechanism. The spindle 531 has the lower end portion to which the grinding wheel 510 is detachably attached. Instead of the grinding wheel 510, one of a bevel wire brush, a non-woven fabric brush, and a diamond wheel can be attached to the spindle 531.

The spindle 531 is rotatably supported to the gear cover 503. A lock pin 511 is provided at the gear cover 503 so as to restrict rotation of the spindle 531 during de-energization of the motor 506 by pushing the lock pin 511. After fixing the spindle 531, the grinding wheel 510 can be replaced by a new grinding wheel by releasing a wheel nut (not shown) at a lower side of the grinding wheel 510 by a wrench.

A sensor magnet (permanent magnet) 521 is attached to a rear end portion of the rotation shaft 517. The sensor magnet 521 is of a circular configuration in which N-pole and S-pole are alternately arranged with a space therebetween in a circumferential direction at every 90 degrees for detecting a rotational position of the rotor. A control board 524 is provided behind the sensor magnet 521. The control board 524 is of a circular or rectangular shape and extends in a direction perpendicular to the axial direction of the rotation shaft 517. The control board 524 installs thereon an inverter circuit. A plurality of rotational position detecting elements 523 such as a hall element are attached to the control board 524 for detecting the rotational position of the sensor magnet 521 to thus detect the rotational position of the rotor. These elements 523 are positioned at every 60 degrees or 120 degrees in the circumferential direction. A combination of the sensor magnet 521 and the rotational position detecting elements 523 constitutes a rotation sensor.

A plurality of switching elements 522 such as FET (field effect transistor) and IGBT (insulated gate bipolar transistor) are provided at the control board 524. These switching elements 522 are positioned radially outward of the sensor magnet 521, so that an increase in entire length of the disc grinder 501 can be avoided for the installation of the switching elements 522. Further, the switching elements 522 are positioned radially outward of the stator core 512 and in the tail cover 504 that is thicker or fatter than the grip portion 502A. The air inlet ports 527 are positioned near the switching elements 522, so that the switching elements 522 can be efficiently cooled.

A power source board 525 having generally circular or rectangular shape is positioned behind the control board 524 and in parallel thereto. A rectification circuit 526 for converting alternate current into direct current is provided at the power source board 525. A full-wave rectifier circuit including a diode bridge and a capacitor is available as the rectification circuit 526. However, other known rectifier circuit is also available. The control board 524 can be provided with a microcomputer (not shown) for fine control to the rotation of the motor 506. The control board 524 and the power source board 525 are nipped by the right half cover 504-1 and the left half cover 504-2 and are fixed at positions. To this effect, the right and left half covers 504-1, 504-2 have inner surfaces provided with a plurality of attachment bosses 533.

The motor 506 has a reduced diameter. To this effect, the stator core 512 is divided into six core segments 513 arrayed in a circumferential direction of the core 512. Each core segment 513 is formed with a groove 513b extending in the axial direction of the rotation shaft 517 in full length of the core segment 513. Further, the motor housing 502 has a six rib protruding radially inwardly and extending in the axial direction for sliding engagement with the grooves 513b to thus guide travel of the core segment 513 along the motor housing 502. An annular abutment portion 502b protrudes radially inwardly from the rear portion of the grip portion 502A.

More specifically, for assembly of the motor 506, the stator core 512 is inserted into the front open end of the large diameter portion of the motor housing 502, while the grooves 513b are aligned with the ribs 502a, and the rear end face of the stator core 512 is brought into abutment with the abutment portion 502b to prevent the stator core 512 from further moving rearward. Instead of the annular abutment portion 502b, a plurality of protrusions spaced away from each other in the circumferential direction can be used. In the latter case, each protrusion should be aligned with each rear end face of each core segment 513.

After the stator core 512 is fully inserted into the motor housing 502, the motor support member 532 is inserted through the front opening of the large diameter portion of the grip portion 502A until the rear end of the small diameter portion 532A is brought into abutment with the front end of the stator core 512. Then, the gear cover 503 is fixed to the motor housing 502 by the screws 528 while the front end of the motor support member 532 is in abutment with the gear cover 503. In this assembling, assembly of the rotor core 516 and the wiring of the coil 514 within the tail cover 503 are also performed. However, such assembling procedure belongs to a conventional technique, and therefore, further description can be neglected.

With this structure, assembly and fixing of the stator core 512 to the motor housing 502 can be facilitated. Further, a minute clearance or gap is provided between the outer peripheral surface of the stator core 512 and the inner peripheral surface of the motor housing 502, so that cooling air can be flowed through the gap, thereby efficiently cooling the stator core 512 and the coil 514.

Figure 14:
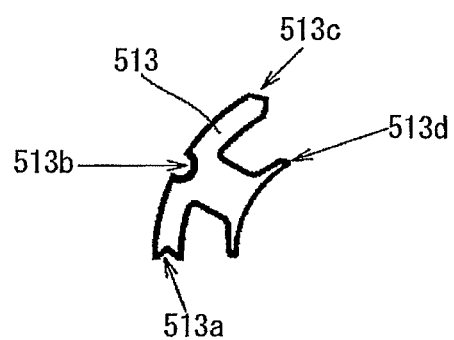
FIG. 14 is a view showing a configuration of a core segment in the disc grinder according to the sixth embodiment.

As shown in FIG. 14, each core segment 513 has a teeth portion 513d around which a copper wire is wound to provide the coil 514. The coil 514 is preferably in the form of a star connection provided with U,V,W phases. An electrical current subjected to control at an energization interval of electrical angle of 120 degrees is supplied to the coil 514 through the switching element 522 based on the position detection signal transmitted from the rotational position detecting element 523.

Figure 13:
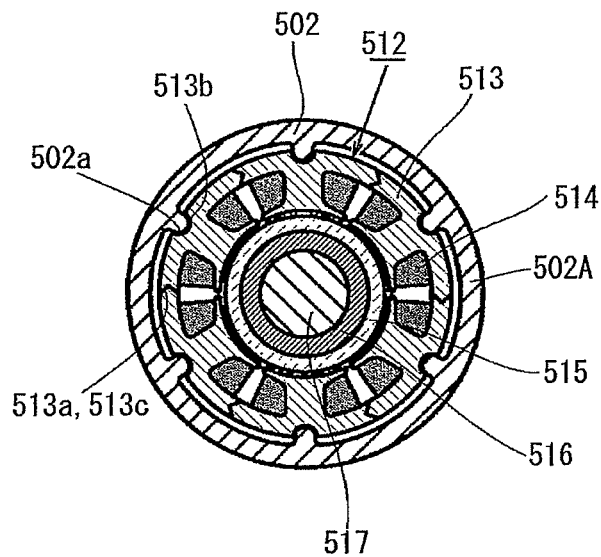
FIG. 13 is a cross-sectional view taken along the line XIII-XIII in FIG. 12.

As shown in FIG. 14, the core segment 513 has a recessed engagement face 513a and a protruding engagement face 513b extending in the axial direction of the rotation shaft 517. The recessed engagement face 513a is in intimate contact with the protruding engagement face 513b of a neighboring core segment as shown in FIG. 13. Six core segments 513 are arrayed side by side on a flat plane in such a manner that each teeth portion 513d is linearly stretched. Then, copper wires are wound over each teeth portion 513d, and then, the six core segments 513 are arcuately bent and fixed to each other by welding or an adhesive agent to provide the hollow cylindrical stator core 512. Because of such assembly, a wire having a larger diameter can be used for the coil 514, to improve a lamination factor of the coil relative to the slot of the teeth portion 513d. As a result, a motor having a reduced diameter can be provided in comparison with a brushless DC motor having a non-divided type stator core and providing an output the same as that of the motor 506. Thus, a densified motor can be provided.

Next, dimension of the disc grinder will be described with reference to FIG. 15. Importantly, the small diameter portion of the grip portion 502A has a diameter d2 smaller than the diameter d1 of the large diameter portion (fan accommodating portion) of the grip portion 502A. Generally, a motor consumes an electric power in accordance with a load applied to the motor. Therefore, the disc grinder cannot produce efficient output power unless the load is applied to the disc grinder 501 even in a situation of high electrical consumption of the disc grinder. On the other hand, high electric power consumption of the motor 506 is not significant if pressing force of the disc grinder against the workpiece is low. In view of the foregoing, the grip portion 502A should have a desirable diameter facilitating gripping in order to properly apply the pressing force of the disc grinder 501 against the workpiece.

Figure 15:
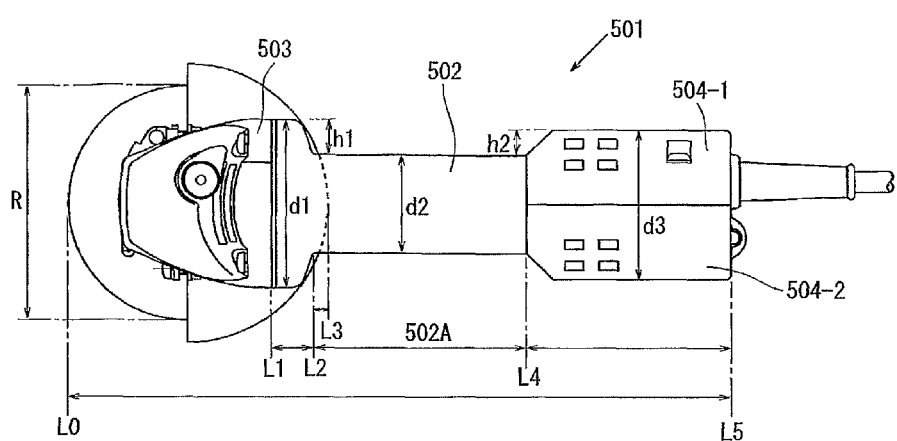
FIG. 15 is a plan view of the disc grinder according to the sixth embodiment for description of each dimension of each portion.

In FIG. 15, "L1-L2" shows a length of a fan accommodating portion, "L2-L3" shows a length of an overlapping portion, "L2-L4" shows a length of the gripping portion 502A, "L4-L5" shows a length of the tail cover portion, and "L0-L5" shows an entire length.

Figure 17:
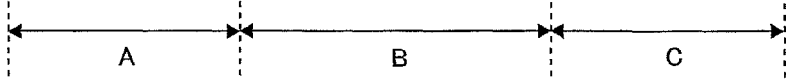
FIG. 17 is a TABLE 1 showing a relationship between an outer diameter of a grip portion and ease of gripping.

FIG. 17 is a table showing the relationship between the diameter d2 of the grip portion 502A and ease of gripping (grippability), in which four grades of grippability, ⊚ (excellent), ○ (good), Δ (not good or not bad), and x (bad) are shown. As a result of the investigation, diameter d2 ranging from 30 mm to 45 mm is sufficient for gripping.

In FIG. 17, in a zone A, a length of the user's finger is longer than the outer peripheral length of the housing, and a user may feel finger ache. On the other hand, user can easily grip the gripping portion, and sufficient finger force can be obtained in a zone B. In a zone C, the length of the user's finger is smaller than the outer peripheral length, and user cannot apply finger force to the gripping portion.

The tail cover 504 should have a diameter d3 equal to or greater than the diameter d2 of the grip portion 502A. An internal volume of the tail cover 504 can be increased because of a radially outwardly protruding portion h2 if d3 is greater than d2. Thus, the control board 524, the power source board 525 and other electrical circuit and components can be accommodated in the interior of the tail cover 504. The diameter d1 of the fan accommodating portion is determined depending on a size of the cooling fan 519. As is apparent from FIG. 15, a front end L2 of the grip portion 502A is positioned frontward of a rear end L3 of the wheel guard 509 to provide an overlapping portion between the grip portion 502A and the wheel guard 509. Because of the formation of the overlapping portion, a users hand can be positioned close to the grinding wheel 510, so that the user's hand power can be easily applied to the grinding wheel to enhance workability.

The tail cover 504 has a frontward/rearward length (L5-L4) that should be as short as possible. The length is preferably approximately equal to or smaller than a length of the grip portion 502A (L4-L2). An entire length (L5-L0) of the disc grinder 501 can be reduced by making a diameter d3 of the tail cover 503 greater than that of the grip portion 502A. Incidentally, the diameter d3 of the tail cover 503 can be reduced by increasing the length (L5-L4) of the tail cover 504 if the entire length of the disc grinder 501 is sufficiently small.

Figure 16:
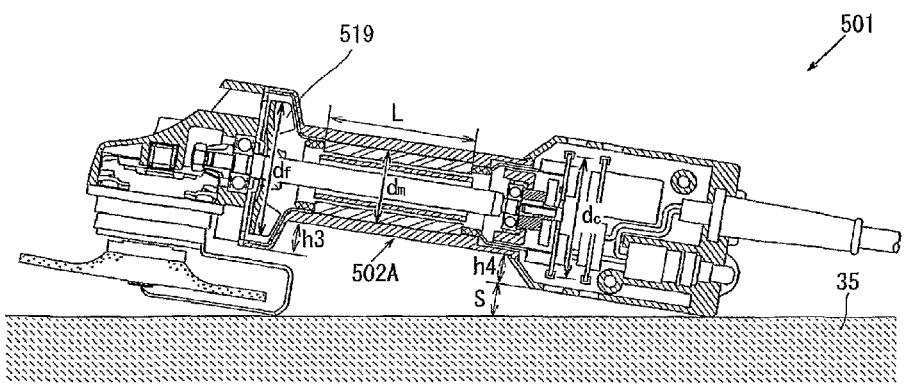
FIG. 16 is a cross-sectional view of the disc grinder according to the sixth embodiment for description of a resting state on a floor during non-operational state of the disc grinder.

FIG. 16 shows a resting state of the disc grinder 501 on a floor 1035 during non-operational state of the disc grinder 501. As is apparent from FIG. 16, the front end portion of the grip portion 502A is thinner than the fan accommodating portion by h3, and the rear end portion of the grip portion 502A is thinner than the tail cover 504 by h4. Therefore, during the resting state, a sufficient space can be provided between the grip portion 502A and the floor 1035. Accordingly, user's hand does not touch the floor 1035 when the user places the disc grinder 501 onto the floor 1035. Further, a user can easily insert his hand into the space for lifting the disc grinder 501. Particularly, the length h4 at the rear end portion of the grip portion 502A can increase the space in addition to the space s.

As best shown in FIG. 16, the motor 506 has a diameter $d_m$ (the radially outermost portion of the stator core 512) sufficiently smaller than the diameter $d_f$ of the cooling fan 519. Further, the circuit board has a diameter or length $d_c$ greater than the diameter $d_m$. Further, the axial length L of the stator core 512 is completely accommodated within the grip portion 502A. With this structure, easy gripping can be realized. Further, desirable weight balance in frontward/rearward direction of the disc grinder 501 can be provided when gripping and lifting the same, since the motor 506 which is the heavy component can be disposed in the grip portion 502A.

Figure 18:
FIG. 18 is a Table 2 showing a relationship between an electric consumption of a motor and workability.

FIG. 18 shows the relationship between the electric consumption of the motor and workability. The motor 506 is axially elongated shape with a reduced diameter such that (motor core length L)/(motor core diameter $d_m$) is in a range of from 1.2 to 2.1. However, the motor 506 generates sufficient rotational torque with power consumption greater than a conventional power consumption in spite of reduction in size. Generally, weight of the motor is increased in accordance with an increase in power consumption, so that a weight of the disc grinder is increased. On the other hand, output power of the motor is increased in accordance with the increase in power consumption to enhance workability or operability, and at the same time, pressing force of the disc grinder 501 against the workpiece is increased in accordance with the increase in weight, thereby increasing grinding speed. However, if the power consumption of the motor is excessively increased, the motor becomes too heavy, to excessively increase pressing force against the workpiece. Consequently, reaction force from the workpiece becomes increased to lower workability. In a table shown in FIG. 18, four grades of workability (operability), ⊚ (excellent), ○ (good), Δ (not good or not bad), and x (bad) are shown. As a result of investigation, sufficient workability can be provided in case of the power consumption ranging from 200 W to 1400 W provided that the diameter of the grinding wheel is in a range of from 100 mm to 125 mm.

In a zone X in Table 2, grinding speed is low, and in a zone Z the motor is heavy to lower the workability. On the other hand in a zone Y, a suitable pressing force to the workpiece can be provided to accelerate grinding work.

Figure 19:
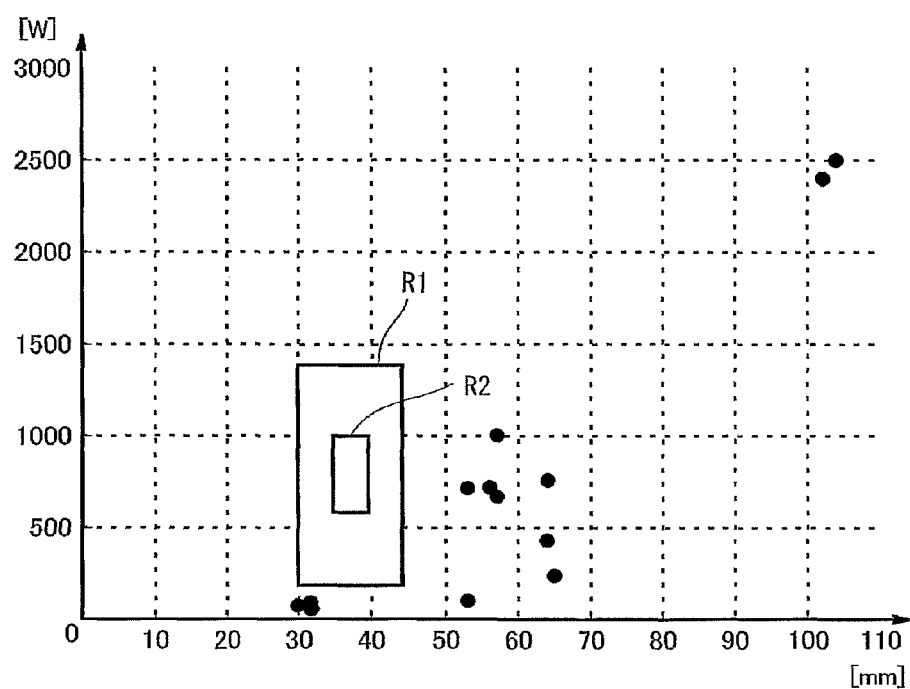
FIG. 19 is a graphical representation showing a relationship between an outer diameter of a motor housing and a power consumption of the motor.

FIG. 19 is a graph showing the relationship between the outer diameter (mm) of the motor housing and the power consumption (W) of the motor 506. Several commercially available disc grinders were selected and the relationship between the outer diameter of the motor housing and the power consumption is plotted by black circles. A grinder having a motor housing whose outer diameter was about 30 mm belongs to a compact grinder in which power consumption is also small. On the other hand, a grinder having a motor housing whose outer diameter was in a range of from 50 mm to 65 mm belongs to an intermediate size grinder corresponding to the grinder according to the present embodiment, where a diameter of the grinding wheel was in a range of from 100 mm to 125 mm. In this type of grinder, a DC brush motor was employed causing large power consumption to produce a large output power. However, downsizing of the DC brush motor was difficult, so that the outer diameter of the housing was relatively large. This prevents the user from gripping the housing with his single hand. A grinder having a motor housing whose diameter was in a range of from 100 mm to 110 mm belongs to a large size grinder in which a diameter of the grinding wheel was relatively large using large size motor, which causes large power consumption of 2500 W.

Among these disc grinders, the disc grinder according to the embodiment realizes motor output ranging from 200 W to 1400 W with the outer diameter of the housing ranging from 30 mm to 45 mm as marked by a rectangle R1 in FIG. 19, thereby realizing ease of gripping and ease of use. Preferably, improved grippability and user-friendliness can be obtained by a disc grinder providing the motor output ranging from 600 W to 1000 W with the outer diameter of the housing ranging from 35 mm to 40 mm as marked by a rectangle R2 in FIG. 19.

In the present embodiment, the brushless DC motor provided by a plurality of divided core segments is used for realizing power consumption ranging from 200 W to 1400 W with the grip portion having the outer diameter ranging from 30 mm to 45 mm at a longitudinally center portion of the disc grinder 501. Thus, the disc grinder capable of providing ease of gripping and ease of use can be realized. Further, a densified motor can be realized by the employment of the divided core segments 513, and thin magnet 515 can be provided by the employment of a hollow cylindrical permanent magnet. As a result, thin grip portion 502A accommodating therein the motor 506 can be provided. Consequently, appropriate pressing force of the disc grinder can be easily applied against the workpiece, facilitating the grinding work at high speed. Further, such grinding work can be performed without a handle, improving grinding work at a narrow working spot.

While the invention has been described in detail and with reference to specific embodiments thereof, it would be apparent to those skilled in the art that various changes and modifications may be made therein without departing from the spirit and scope of the invention. For example, in the first, second, third, and fourth embodiments, the diameters of the power source board 82 and the control board 83 be slightly smaller than the outer diameter of the motor 3. However, these diameters can be equal to or greater than the outer diameter of the motor 3. Further, the diameter of the FET board 284 is slightly smaller than the outer diameter of the motor 3 in the third embodiment. However, the diameter can be equal to or greater than the outer diameter of the motor 3.

Further, in the first, second, third, fourth, and fifth embodiments, each motor driver circuit 8, 108, 208, 308, 408 contains the smoothing capacitor 81. However, the smoothing capacitor 81 can be dispensed with so that the power cord 7 is directly connected to the power source board 82.

Further, instead of the rotational position detecting element 523 for the detection of the rotational position of the magnet 515 of the rotor in the sixth embodiment, a sensorless type detection of the rotational position is available in which an induced voltage (back electromotive force) of the coil 514 is filtered to provide a logic signal for the detection of the rotor position.

Further, in the sixth embodiment, AC power source is used. However, a secondary battery pack such as a lithium-ion battery can be used for driving the brushless DC motor.

INDUSTRIAL APPLICABILITY

The power tool according to the invention is particularly available for a disc grinder equipped with the brushless motor.

The invention claimed is:

1. An electric power tool comprising:
   a housing defining an axial direction including a grip portion that extends in the axial direction, the housing having: an inner surface; one end portion formed with an air outlet port; and another end portion formed with an air inlet port, an air passage being defined in the housing from the air inlet port to the air outlet port;
   a brushless motor accommodated in the grip portion and having a drive shaft; and
   a motor driver circuit accommodated in the grip portion and configured to drive the brushless motor;
   wherein the motor driver circuit includes a switching circuit board on which a switching element is surface-mounted, the switching circuit board extending in a direction substantially parallel to the extending direction of the grip portion;
   wherein the housing has a guide portion protruding toward the switching circuit board from the inner surface, the guide portion being integral with the housing and having a guide surface extending in a direction parallel to the switching circuit board;
   wherein the air passage includes a gap defined between the switching circuit board and the guide surface, the air passage being configured to direct a cooling air flow through the gap.

2. The electric power tool as claimed in claim 1 wherein the housing has an outer diameter that is uniform.

3. The electric power tool as claimed in claim 1, further comprising a switch protruding from the another end portion and extending in the axial direction.

4. The electric power tool as claimed in claim 1, wherein the motor driver circuit further includes a plurality of additional circuit boards.

5. The electric power tool as claimed in claim 4, wherein each of the plurality of additional circuit boards has a mount surface, at least one of the mount surfaces extending in a direction generally perpendicular to the extending direction of the grip portion.

6. The electric power tool as claimed in claim 5, wherein each of the plurality of additional circuit boards has a mount surface, each of the mount surfaces extending in the direction generally perpendicular to the extending direction of the grip portion.

7. The electric power tool as claimed in claim 6, wherein the brushless motor has an outer cross-sectional shape, and each of the plurality of additional circuit boards has an outer profile generally similar to the outer cross-sectional shape.

8. The electric power tool as claimed in claim 6, wherein each of the plurality of additional circuit boards has a generally disc-like shape and the plurality of circuit boards is arrayed generally coaxially with the brushless motor.

9. The electric power tool as claimed in claim 4, wherein the grip portion defines a diametrical direction, each of the plurality of additional circuit boards being partly overlapped with an outer profile of the brushless motor as viewed in the axial direction.

10. The electric power tool as claimed in claim 1, further comprising:
    an end tool detachably attached to the one end portion;
    a gear portion that transmits driving force from the brushless motor to the end tool; and
    a power cord extending from the another end portion for supplying an external electrical power, and
    wherein the power cord, the motor driver circuit, the brushless motor, the gear portion, and the end tool being arranged in this order from the another end portion to the one end portion.

11. The electric power tool as claimed in claim 1, further comprising:

an end tool provided on the one end portion side; and a power cord extending from the another end portion for supplying an external electrical power;

wherein the motor driver circuit further includes:

a rectifying circuit electrically connected to the power cord for rectifying the external electric power; and an inverter circuit that converts the rectified electric power into an inverter signal;

wherein the switching circuit board drives the brushless motor based on the inverter signal; and wherein the power cord, the rectifying circuit, the inverter circuit, the switching circuit board and the brushless motor are arranged in this order from the another end portion to the one end portion.

12. The electric power tool as claimed in claim 1, further comprising:

an end tool provided on the one end portion side; and a power cord extending from the another end portion for supplying an external electrical power;

wherein the switching circuit board has a mount surface on which the switching element is surface-mounted, the switching element having a parallelepiped configuration provided with a largest area surface among six surfaces, the largest area surface extending in a direction generally parallel to a direction from the another end portion to the one end portion.

13. The electric power tool as claimed in claim 1, wherein the guide portion is positioned near the switching element, the air passage including a space defined between the guide portion and the switching element.

14. The electric power tool as claimed in claim 1, further comprising an output shaft extending in a direction generally perpendicular to the drive shaft.

* * * * *